Figure 1:
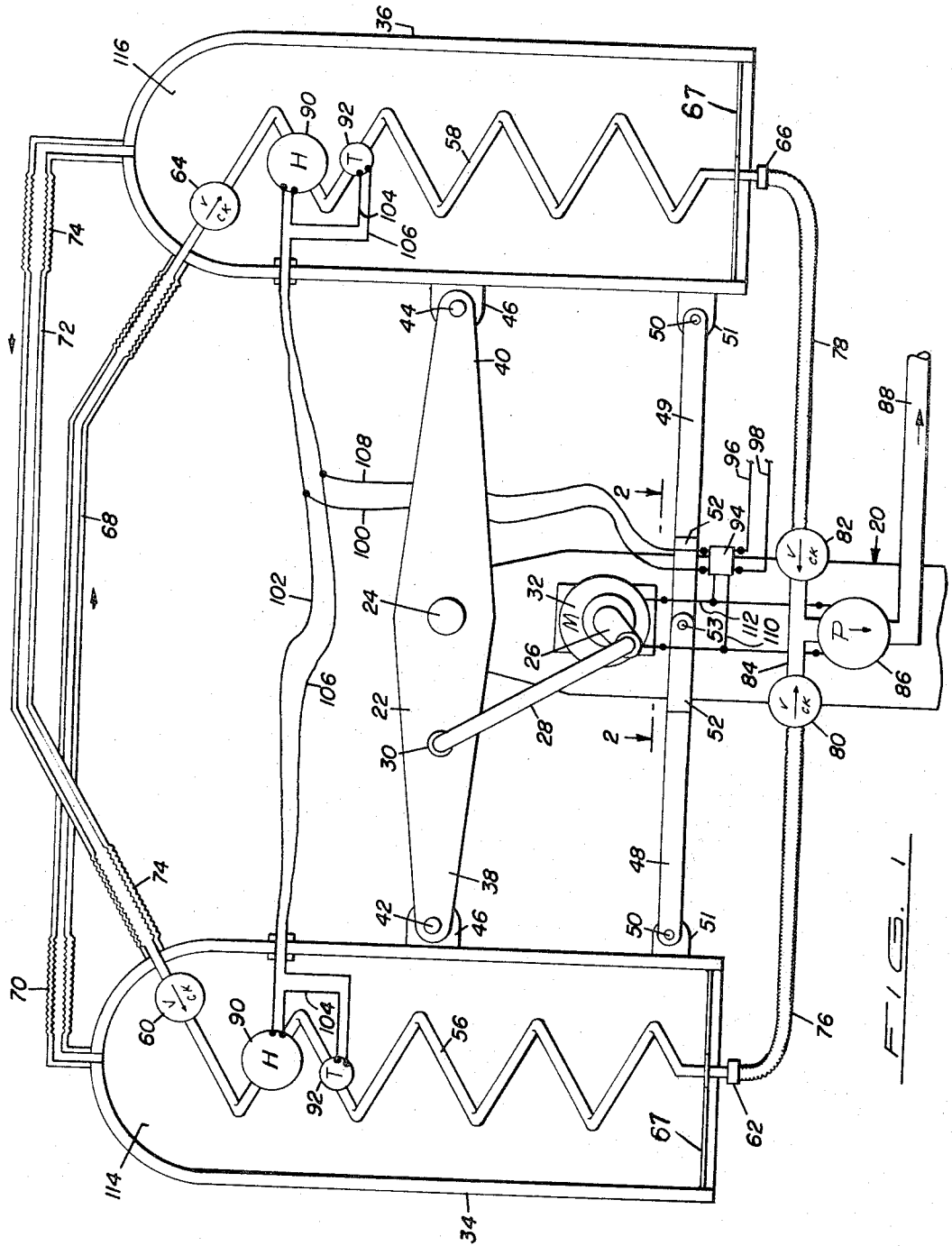

Aug. 29, 1967  E. L. PARR  3,338,798
ALTERNATING STILL DESALINATION
Filed Jan. 17, 1966  4 Sheets-Sheet 1

INVENTOR.
EDWARD L. PARR
BY
FULWIDER PATTON RIEBER LEE & UTECHT
ATTORNEYS

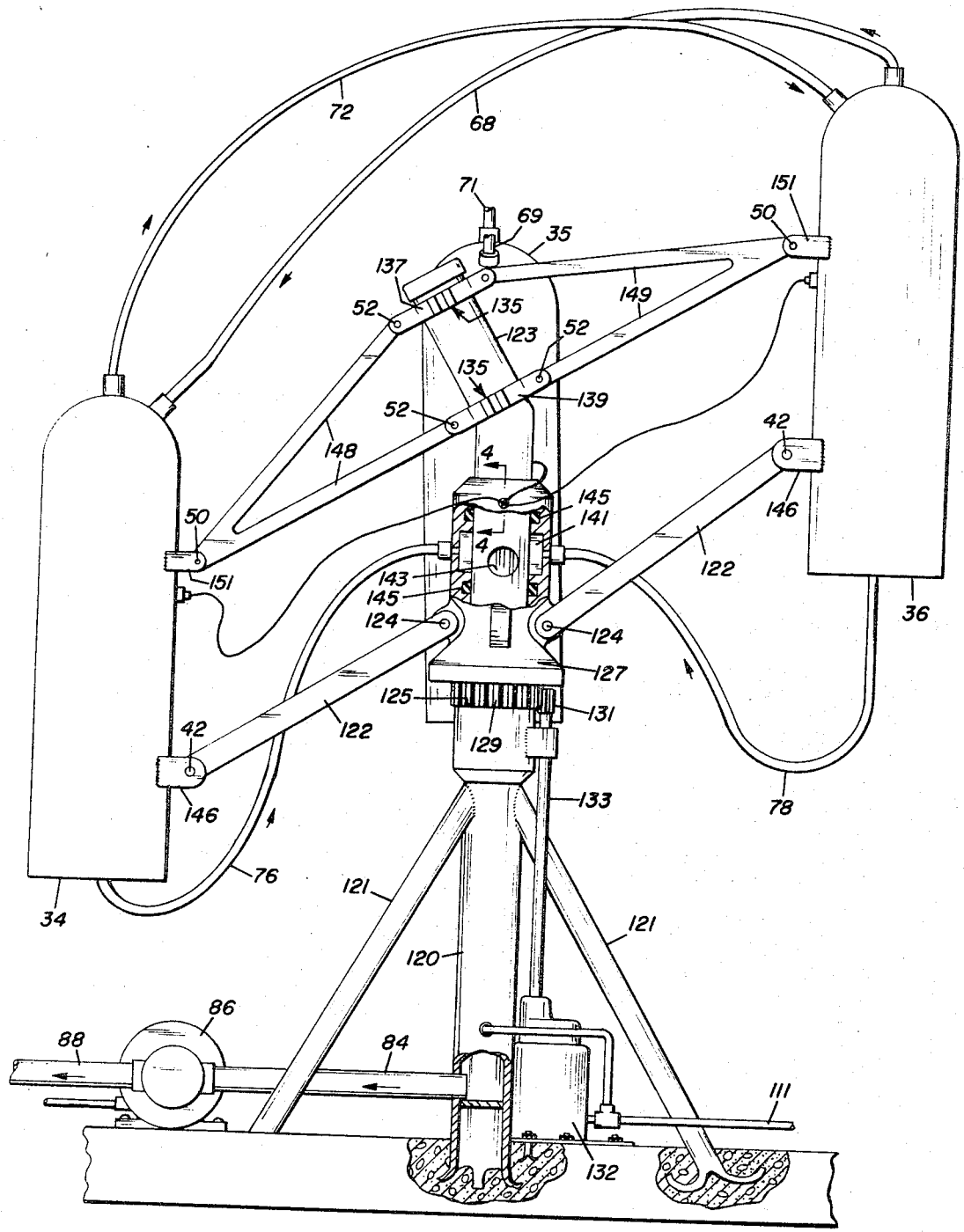

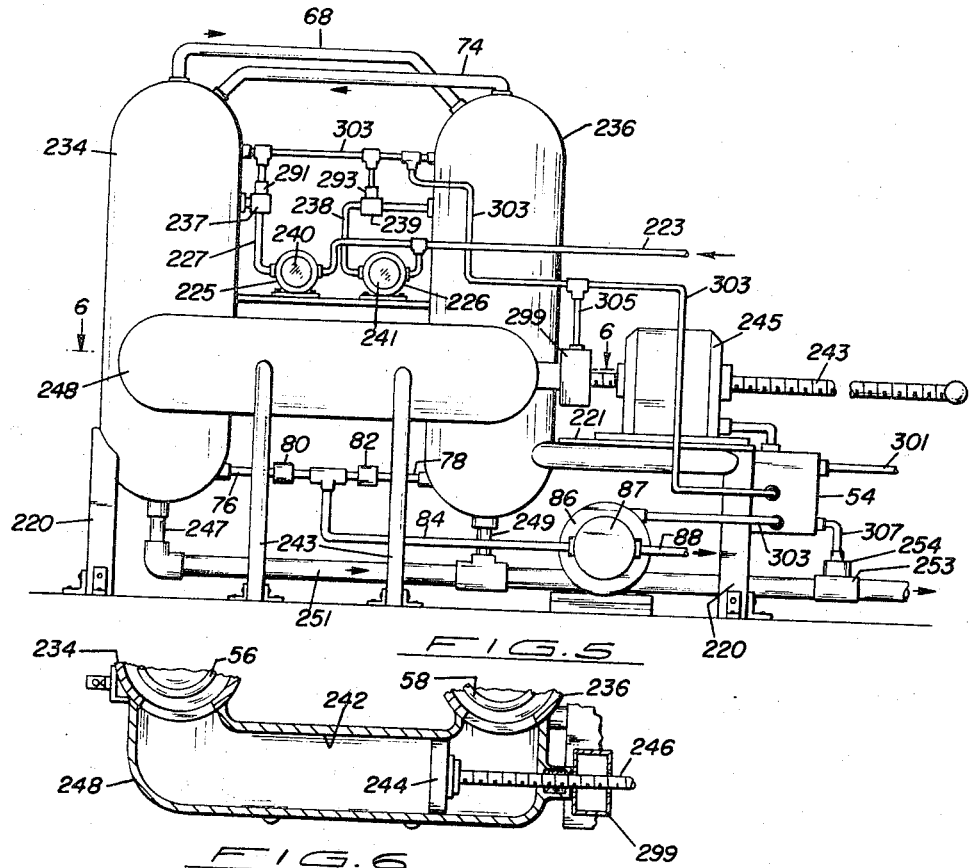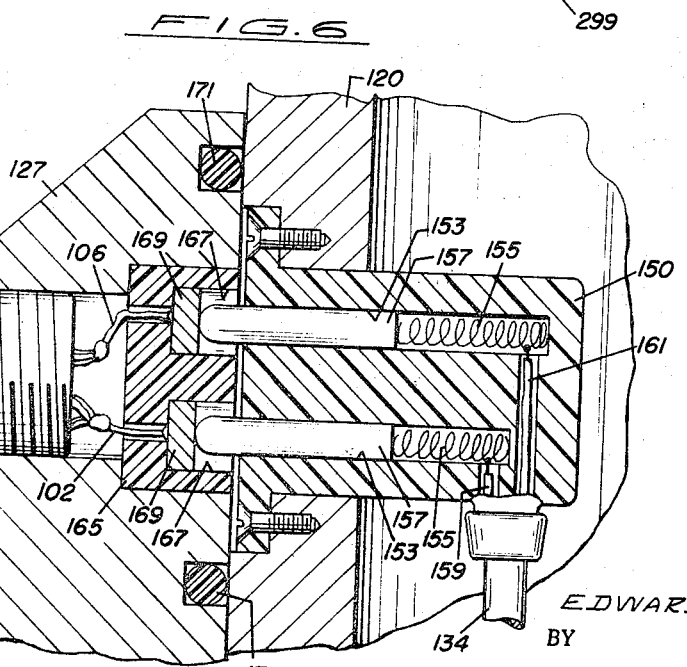

United States Patent Office 3,338,798
Patented Aug. 29, 1967

3,338,798
ALTERNATING STILL DESALINATION
Edward L. Parr, 301 N. Cuyamaca,
El Cajon, Calif. 92020
Filed Jan. 17, 1966, Ser. No. 521,187
6 Claims. (Cl. 203—11)

The present invention relates to the method of distilling liquor and more particularly a method of converting salt water to fresh water and to the still for carrying out the method.

The method of the present invention comprises instituting the step of increasing the vapor space above an upwardly confined body of liquor, such as sea water and simultaneously heating the confined body of liquor by conducting heat from the vapor and/or condensate in a fluid type heat exchanger, the latter having an inlet and an outlet and being disposed in intimate heat exchange relation with the aforementioned upwardly confined body of liquor. This step also includes simultaneously decreasing the vapor space above a second upwardly confined body of the liquor and simultaneously conducting vapor and/or condensate from the last mentioned space to the inlet of the aforementioned heat exchanger.

Thereafter, the method comprises the step of increasing the vapor space above the second mentioned confined body of liquor and simultaneously heating the second mentioned confined body of liquor by conducting heat from the vapor and condensate in a fluid type heat exchanger having an inlet and an outlet and disposed in intimate heat exchange relation with the second mentioned confined body of liquor. This second mentioned step also includes simultaneously conducting vapor from the first mentioned upwardly confined space to the inlet of the second mentioned heat exchanger.

The method also includes causing alternate institution of those steps. It also includes impeding the flow of vapor from the second mentioned heat exchanger to the first mentioned confined space while the first mentioned step is taking place, and, impeding the flow of vapor from the first mentioned heat exchanger to the second mentioned confined space while the second mentioned step is taking place.

The method further includes conducting the distillate from the outlets of the heat exchanger through a conduit having the characteristic of impeding the flow of distillate therethrough.

In one form of the invention, the still comprises two inverted containers in the form of cups which are disposed, for example, in the sea in such a manner that the lower section of each is adapted to contain sea water and the upper section of each is adapted to contain water vapor or steam. Each cup contains a heat exchanger disposed in the sea water. The upper section of one cup is connected to the heat exchanger of the other cup and vice versa. Means is provided for restricting the flow of water vapor, steam and fresh water. Mechanism is provided for simultaneous, alternately and intermittently lowering one cup while raising the other.

In another form of embodiment, the still includes two closed and stationary containers and means for providing a controlled rate of flow of sea water into the containers. Liquid moving mechanism is provided for varying the pressures alternately in the closed containers. A cylinder is connected with the containers and a piston reciprocates within the chamber. A mechanism is provided for imparting relative movement between the cylinder and piston for effecting an alternate and intermittent pressure decrease in one container and increase in the other.

Other features and the advantages of the present invention will be apparent from the following description, reference being had to the accompanying drawings wherein preferred embodiments of the invention are illustrated.

Figure 2:
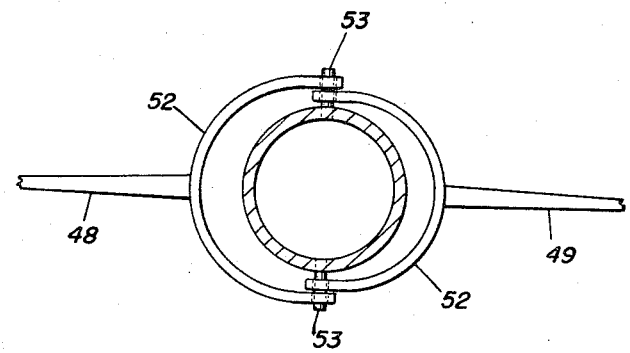
Figure 7:
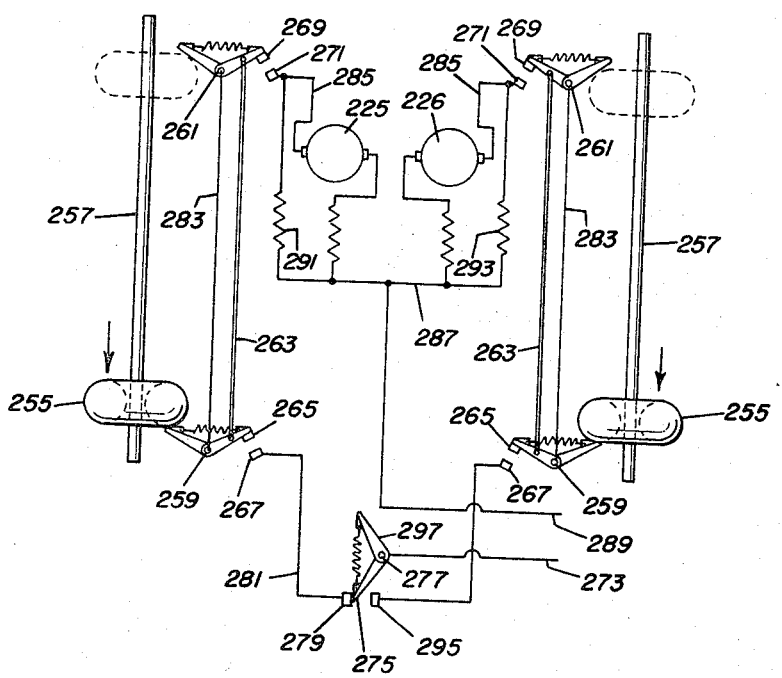

In the drawings:
FIG. 1 is a diagrammatical view of one embodiment of the still of the present invention;
FIG. 2 is a fragmentary, sectional view of the still shown in FIG. 1, which view is taken along the line 2—2 of FIG. 1;
FIG. 3 is a side view of another embodiment of the still, part thereof being in longitudinal cross section;
FIG. 4 is a fragmentary, sectional view of the still shown in FIG. 3, which view is taken along line 4—4 of FIG. 3;
FIG. 5 is a side view of another embodiment of the still;
FIG. 6 is a sectional view of the still shown in FIG. 5, which view is taken along line 6—6 of FIG. 5; and
FIG. 7 is a diagrammatic view of the control mechanism for two of the pump motors of the embodiment shown in FIG. 5.

Referring to the drawings in detail, and particularly to FIG. 1, the still 18 is of the type for desalting sea water and includes an upright frame 20 which is supported on the floor of a sea.

A generally horizontally extending walking beam or lever 22 is pivotally supported by pin 24 at the upper end of the frame 20. This beam is oscillated by a motor through a crank 26 and connecting rod 28, the latter being attached to a beam carrying bearing 30. The motor may be of any generally acceptable type and is herein shown as an electric motor 32.

Two open bottom and closed top containers 34 and 36 are pivotally attached, respectively, to the opposite ends 38 and 40 of the beam 22 by pivot pins 42 and 44. These pins extend through bosses 46 disposed on the sides of the containers. The containers may be formed of heat insulating material or thermally insulated in any suitable manner. Stabilizing links 48 and 49 are disposed below the walking beam 22. These links pivotally connect the containers 34 and 36, respectively, with the frame 20 by pivot pins 50 and bosses 51 on the sides of the containers, and yokes 52 and pivot pins 53 on the front and back of upright frame 20.

Rotation of the motor 32 causes substantially vertical reciprocation of the containers 34 and 36; one container will be moving upwardly while the other is moving downwardly, and vice versa.

The containers are submerged at least partly in the salt water. Heat exchangers 56 and 58 are disposed, respectively, in the containers 34 and 36 and are supported in position so that they will be submerged in the salt water when the still 18 is in the operating position. The heat exchanger 56 is provided with an inlet, in the form of a check valve 60 disposed at the upper end of the exchanger and an outlet 62 at the bottom thereof. A like inlet type check valve 64 and a like outlet 66 is provided for the heat exchanger 58. Spiders 67 hold the heat exchanger in position.

A conduit 68 connects the upper end of container 34 with exchanger 58 in the container 36. The check valve 64 prevents the flow of fluid from exchanger 58 to container 34. Said conduit includes two flexible sections 70, which sections are adapted to permit relative movement between the containers 34 and 36. A similar conduit 72, including check valve 60, connects the upper end of container 36 with the heat exchanger 56 in container 34. The check valve 60 prevents the flow of fluid from exchanger 56 to the container 36. Like conduit 68, conduit 72 is provided with two flexible sections 74.

A flexible conduit 76 is connected with the outlet 62 of the heat exchanger 56 disposed in container 34, and a flexible conduit 78 is attached to the outlet 66 of the heat exchanger 58 disposed in container 36. These conduits 76 and 78 include any desirable form of restrictors, herein shown, respectively, as check or back pressure valves 80 and 82. Said conduits 76 and 78 feed into a common conduit 84 which conduit is in communication with an outlet pump 86. Said pump, pumps the fresh water generated by the still to the place of use or to a storage facility through tube 88.

Electric heating elements 90 are disposed in intimate heat exchange relationship with the sea water adjacent the upper ends of each of the heat exchangers 56 and 58. These heating elements are controlled by thermostats 92 and therefore are effective for heating fluid in the heat exchangers only upon initiation of starting of the apparatus.

Electric current is supplied to the heating elements 90 and thermostats 92 from junction box 94 which is connected with a source of current by wires 96 and 98. The heating circuit comprises wires 100 and 102, heating elements 90, wires 104, thermostats 92 and wires 106 and 108. Thus, the heating elements are connected in parallel and the thermostats are connected in series, respectively, with the heating elements.

The motor 32, and electric pump 86 are connected in parallel circuit relation to the junction box 94 by wires 110 and 112.

From the foregoing, it will be apparent that, in starting the apparatus, the heaters 90 are electrically energized to create steam in the upper spaces 114 and 116 in the containers 34 and 36, respectively. Also, if desirable, the motor 32 can be started at that time or the starting of the motor can be delayed until steam is generated. The motor 32, upon starting, imparts oscillating motion to the beam 22, causing one container, as for example 34, to be moved downwardly with respect to the surface of the sea water contained in that container. The water will act as a piston causing the space 114, within that container and above the water surface, to be decreased, thereby increasing the vapor pressure in that space. This pressure increase acts to increase the intrinsic heat of the vapor in that space 114 thereby super heating the vapor. The vapor generated will be conducted through conduit 68 and check valve 64 to the heat exchanger 58 in container 36. During the compression stroke of container 34, the container 36 will be moving upwardly, decreasing the pressure in space 116 thereby at least partly counteracting the heating effect of heater 90 in container 36, whereby the desalted distillate entering heat exchanger 58 and passing downwardly therethrough will be cooled and will condense into desalted water. This water then passes through the outlet 66 of the exchange 58, through tube 78, check valve 82 and into the pump 86, whence it is delivered to the desired place by tube 88.

The container 34 will then be moved upwardly with respect to the surface of the water therein, thus increasing the space 114 within the chamber 34 and above the surface of the water, thereby causing the pressure in said space to be decreased. This pressure decrease, together with the continued heating effect of the heater element 90, will cause the rate of sea water vaporization to be increased. The stroke of the containers is preferably thirty feet and soon after starting, the heat generated during the compression is more than sufficient to create the desired vaporizations, at which time the heaters are rendered ineffective by the thermostatic controllers 92.

It will be understood that what has been described with respect to container 34 and heat exchanger 58 applies also to container 36 and heat exchanger 56 when the container 36 is moved downwardly, i.e., its compression stroke. It will also be understood that the check valves 60 and 64 prevent reverse flow of fluid from spaces 116 and 114, during the elevating strokes of the containers.

As these vapors pass through said heat exchangers, latent heat will be transferred from the vapor and condensate in the heat exchanger to the sea water in the containers. Such heat transfer will increase the heating rate of said sea water resulting in a greater rate of vaporization in the container.

It will be noted that salt will become more concentrated in the salt water remaining in the container as the vaporization process continues and that such concentrate, being more dense than the buoying salt water, will sink from the containers and will be mixed readily with the sea water below the containers.

In the embodiment depicted in FIG. 3, the still 118 comprises a vertically extending hollow post 120 braced by braces 121. The extreme upper end of the post includes a section 123 that forms an obtuse angle with the lower section of the post. The post 120 is provided with an upwardly facing shoulder 125 disposed approximately midway of the ends thereof.

This shoulder rotatably supports a collar 127 which surrounds and closely embraces the post below the angularly disposed section 123. Collar 127 includes a ring gear 129 which is rotated by a pinion 131 which latter is driven through a shaft 133 by the motor 132.

A series of links (for example, four, only two of which are shown at 122) has one end of each pivotally connected with the collar 127 by pins 124, and the other ends thereof are connected by pins 142 to the bosses 146 on the containers 34 and 36. A third container is shown in the rear and indicated at 35. Container guiding mechanism 135 is connected between the angularly disposed post section 123 and the containers. This mechanism includes two freely rotatable upper and lower collars 137 and 139, which are journalled on the angularly disposed post section 123, and four V-shaped links, two of which are shown at 148 and 149. The yoke ends of the links are pivotally connected by pins 50 with the bosses 151 on the containers. The ends opposite the yoke of each link are connected with the upper and lower collars 137 and 139. As seen in FIG. 3, the container 34 is diagrammatically opposite container 36, and container 34 is at its lowest position and container 36 is at its highest position.

Upon rotation of the collar 127, all of the containers will be rotated, and as shown, as container 34 will be elevated during rotation, container 36 will be de-elevated commensurate with the elevation of container 34. This raising and lowering of the containers effects distilling as explained with respect to FIG. 1. The containers and heat exchangers are connected as in FIG. 1, by conduits 68 and 72. Like conduits would be provided for the other two containers, two of which are for container 35, are shown at 69 and 71. Also, heating and thermostatic controls for the heating elements are provided for each container.

In this embodiment, FIG. 3, the desalted water is conducted from the heat exchangers in the containers to the interior of the hollow post 120 and then by pipe 84 to the pump 86. As shown, the outlet tubes 76 and 78, leading from the heat exchangers, are connected with an annular groove 141 formed in the interior of the collar 127, which groove is in open communication with the interior of the hollow post 120 by an opening 143 in the post. O-ring type seals 145 are closely embraced by the collar 127 and closely embrace the post 120 to prevent leakage from the groove along the post.

Electric current is supplied from a junction box (not shown) through a cable 111 to the motor 132 and through a branching cable 101 to the interior of the post 120. The post 120 (FIG. 4) carries a block 150 formed of dielectric material and is provided with two sockets 153 for receiving springs 155 and brushes 157. These springs and brushes are connected with the wires 159 and 161 in the cable 134. The rotatable collar 127 is provided in the interior thereof with a socket 163 for receiving a dielectric block 165 having grooves 167 for slip rings 169 which are connected with wires 102 and 106 for the heating element 90. O-rings 171 are disposed above and below the blocks 151 and 165 to prevent leakage along the post 120.

Referring now to the embodiment shown in FIGS. 5, 6 and 7, the still 218 includes a plurality of frame members 220 for supporting the parts forming the still. One of these frame members is in the form of a platform 221. The still 218 includes two closed containers 234 and 236 having heat exchangers 56 and 58, respectively therein, as shown in FIG. 1; the heat exchanger in container 236 being connected with the top of container 234 by a tube 68, and the heat exchanger in container 234 being connected with the top of container 236 by a tube 74.

The liquor to be distilled is delivered to the containers 234 and 236 through a pipe 223. Two pumps 225 and 226 (see FIG. 7) are provided, the inlet sides of which are connected with pipe 223. Liquor is delivered from the pump 225 to container 234 through pipe 227 having an electromagnetically controlled valve 237 therein, and liquor is delivered from pump 226 to container 236 through a pipe 238 having an electromagnetically controlled valve 239 therein. Pump 225 is driven by an electric motor 240 and pump 226 is driven by an electric motor 241.

A large tube 248 is in open communication with both containers 234 and 236 either below or above the liquor level and for illustrative purpose, it is shown below the liquor level in the containers and is therefore filled with liquor at all times. Tube 248 forms a horizontally extending cylinder 242 which is supported by braces 243. A reciprocatable piston 244 is disposed in the cylinder. This piston may be reciprocated in any suitable manner and is herein shown as being reciprocated by a rotatable screw 246 which is driven by an electric motor 245 of the reversible type. Any suitable electric switching mechanism (not shown) can be employed for causing reversal of rotation of the motor 245 at the ends of the strokes of the piston.

Brine, in case the liquor delivered to the containers 234 and 236 is sea water, is withdrawn from the containers through pipes 247 and 249, respectively. These pipes are connected with a pipe 251. An adjustable valve 253 controls the rate of flow of brine from the containers 234 and 236. This valve can be adjusted by an electric motor 254.

The quantity of water delivered to the containers 234 and 236 is controlled by controlling the pumps 225 and 226, respectively. This is shown diagrammatically in FIG. 7. The motors are started and stopped by float controlled mechanism. A float 255, in the form of an annulus, in container 234 is guided vertically by a stationary rod 257 which extends through the annulus. This float, upon descending to a predetermined low level, actuates a snap acting switch, shown diagrammatcially at 259, and, upon ascending to a predetermined high level, actuates a like switch, shown at 261. The switches are connected with one another by a link 263.

When the float descends to the predetermined low level, it actuates to close switch contact 265 on contact 267, and through the link 263, it actuates switch 261 to close a contact 269 on contact 271. When the float ascends to the predetermined high level, it actuates switch 261 to separate contact 269 from contact 271, and through the link 263, it actuates switch 259 to separate contact 265 from contact 267.

The circuit for motor 225 and for the electromagnetically controlled valve 237, includes the contacts 265 and 267 of switch 259 and the contacts 269 and 271 of switch 261. This circuit is traced as follows: Wire 273, movable contact 275 of a switch 277, contact 279, wire 281, contacts 267 and 265 of switch 259, wire 283 which connects switch 259 with switch 261, contacts 269 and 271, wire 285, motor 240 and wires 287 and 289. The electromagnetic coil 291 for opening valve 237 is connected in parallel relationship with motor 240. A like circuit is provided for motor 241 and the electromagnetic coil 293 for valve 239, excepting that this latter circuit includes contact 295 of switch 277.

The arm 297 is controlled by movement of the piston actuating screw 246 which is driven by the motor 245. The mechanism for actuating the switch arm 297 is disposed in the housing 299. The switch 277 is in the position shown in FIG. 7 only when the piston 244 is moving to the left whereby pump 226 can be actuated to pump liquor into container 236 only while pressure is being increased by the piston. It will be understood that the pressure that can be created by either pump 225 or 226 is greater than the maximum pressure that is created by the movements of the piston 244.

The wires leading to the junction box 54 are enclosed in sheath 301; those leading from the junction box to the heaters 90 are enclosed in sheath 303; those leading from the junction block to the switch 277 in housing 299 are enclosed in sheaths 303 and 305; those leading from the junction block and from the switch 277 to the motors 225 and 226 and coils 291 and 293 are enclosed in sheath 303; and those leading from the junction block to the motor 254 for valve 253 are enclosed in sheath 307.

Thus, it is apparent that the effect created by the moving piston 244 in cylinder 242 is equivalent to the effect created by the reciprocating containers 34 and 36 in the embodiments shown in FIGS. 1 and 3. As in the embodiments shown in FIGS. 1 and 3, the distillate is withdrawn, respectively, from the heat exchanger, disposed in containers 234 and 236 by tubes 76 and 78, through check valves 80 and 82, respectively, and then via tube 84, pump 86 and tube 88.

While the forms of embodiment herein shown and described, constitute preferred forms, it is to be understood that other forms may be adapted falling within the scope of the claims that follow.

I claim:

1. A still for liquor comprising in combination:
(A) two closed-top containers disposed in the liquor, said containers each having an opening in the lower portion thereof;
(B) a heat exchanger disposed in the liquor in one of the containers, said heat exchanger having an inlet and an outlet;
(C) a heat exchanger disposed in the liquor in the other of the containers, the second mentioned heat exchanger having an inlet and an outlet;
(D) a conduit connecting the upper part of one of the containers with the inlet of the heat exchanger in the other container;
(E) means in said conduit for impeding the flow of fluid from said other container to the said one chamber;
(F) a conduit connecting the upper part of said other container with the inlet of the heat exchanger in said one chamber;
(G) means in the second mentioned conduit for impeding the flow of fluid from said one container to said other container;
(H) conduit means connected with the outlets of the heat exchangers, said conduit means providing resistance to the flow of water therethrough;
(I) movable means for intermittently and alternately effecting partial vacuum in the space above the water level in one of the containers and compression in the space above the water level in the other of said chambers.

2. A still as defined in claim 1, characterized in that each of the containers is in the form of an inverted cup, and further characterized in that the movable means comprises mechanism for alternately and intermittently lowering one cup and raising the other cup.

3. A still as defined in claim 1, characterized in that the movable means (I) includes:
(1) a support frame;
(2) an elongated lever supported oscillatably intermediate its ends on a horizontal axis by the support post;
- (3) means for attaching the containers to the elongated lever, one container being spaced on one side of the horizontal axis and the other container on a second side of said lever;
- (4) mechanism for imparting an oscillatory motion to the elongated lever.

4. A still as defined in claim 1, characterized in that the means (I) includes:
- (1) a support including:
    - (a) a section extending at an angle with respect to vertical;
- (2) means rotatably mounted on said angularly disposed section;
- (3) an elongated, rigid link attached to rotatable means and rotatable therewith;
- (4) a second elongated link attached to the rotatable means and rotatable therewith;
- (5) means for pivotally attaching one of said containers to the first mentioned link, said container being spaced from the angled section;
- (6) means for pivotally attaching the other of said containers to the second mentioned link, said container being spaced from the angled section;
- (7) means for maintaining said containers in substantially an upright position;
- (8) and means for rotating the rotatable means.

5. A still as defined in claim 1, characterized in that the containers are of the closed type, and further characterized in that the movable means defined in (I) comprises:
- (1) a conduit connected with both containers;
- (2) means in said last mentioned conduit for increasing the pressure in one container of said containers and simultaneously decreasing the pressure in the other container and vice versa;
- (3) and means for actuating the last mentioned means.

6. The method of converting sea water to fresh water, which consists in: instituting the step of simultaneously generating vapor from sea water and condensing fresh water vapor which comprises increasing the vapor space above an upwardly confined body of sea water and simultaneously heating the confined body of sea water by conducting heat from the vapor and condensate in a fluid type heat exchanger having an inlet and an outlet and disposed in intimate heat exchange relation with said confined body of sea water, and simultaneously decreasing the vapor space above a second upwardly confined body of sea water and simultaneously conducting vapor from the last mentioned space to the inlet of the heat exchanger; thereafter instituting the step of simultaneously generating vapor from the sea water of the second mentioned confined body of sea water and condensing fresh water which comprises increasing the vapor space above the second mentioned confined body of sea water and simultaneously heating the second mentioned confined body of sea water by conducting heat from the vapor and condensate in a fluid type heat exchanger having an inlet and an outlet and disposed in intimate heat exchange relation with the second mentioned confined body of sea water, and simultaneously decreasing the vapor space above the first mentioned confined body of sea water and simultaneously conducting vapor from the first mentioned confined space to the inlet of the second mentioned heat exchanger, causing alternating institution of said steps; impeding the flow of vapor from the second mentioned heat exchanger to the first mentioned confined space while the first mentioned step is taking place; impeding the flow of vapor from the first mentioned heat exchanger to the second mentioned confined space while the second step is taking place; conducting water from the outlets of the heat exchangers through conduit means; and impeding the flow of water through said conduit means.

References Cited

UNITED STATES PATENTS

| 1,204,716 | 11/1916 | Thorssell | 203—24 |
| 1,258,407 | 3/1918 | Hill | 230—70 |
| 3,275,532 | 9/1966 | Harper | 203—11 |

FOREIGN PATENTS 6,406,791　12/1964　Netherlands.

NORMAN YUDKOFF, *Primary Examiner.*

D. EDWARDS, *Assistant Examiner.*